(12) United States Patent
Chen et al.

(10) Patent No.: US 7,028,275 B1
(45) Date of Patent: Apr. 11, 2006

(54) QUANTUM CIRCUIT DESIGN FOR GROVER'S ALGORITHM

(75) Inventors: Goong Chen, Brazos County, TX (US); Zijian Diao, Champaign, IL (US); Muhammad S. Zubairy, College Station, TX (US)

(73) Assignee: The Texas A&M University System, College Station, TX (US)

( * ) Notice: Subject to any disclaimer, the term of this patent is extended or adjusted under 35 U.S.C. 154(b) by 249 days.

(21) Appl. No.: 10/271,652

(22) Filed: Oct. 15, 2002

Related U.S. Application Data

(60) Provisional application No. 60/329,698, filed on Oct. 15, 2001.

(51) Int. Cl.
*G06F 17/50* (2006.01)
*G06F 17/10* (2006.01)

(52) U.S. Cl. .............................................. 716/4; 703/2

(58) Field of Classification Search ................ 716/1–4; 703/2
See application file for complete search history.

(56) References Cited

U.S. PATENT DOCUMENTS

| | | | | |
|---|---|---|---|---|
| 5,917,322 | A | * 6/1999 | Gershenfeld et al. | 324/307 |
| 6,317,766 | B1 | * 11/2001 | Grover | 708/400 |
| 6,635,898 | B1 | * 10/2003 | Williams et al. | 257/14 |

FOREIGN PATENT DOCUMENTS

| | | |
|---|---|---|
| JP | 09-058295 | 3/1997 |
| JP | 11-318001 | 11/1999 |
| JP | 2001-177909 | 6/2001 |

OTHER PUBLICATIONS

J. Ahn et al., "Fast Quantum search using coherent electron states of Ryderg atoms," Monday Morning/QELS '99, pp. 5–6.*
A. Barenco, "A Universal Tw–Bit Gate for Quantum Computation," Proc. R. Soc. London A, Jun. 1995, 4 pages.*
T. Beth, "Quantum Computing: An Introduction," ISCAS 2000—IEEE Int'l Symposium on Circuits and Systems, pp. 735–736.*
I.L. Chang et al., "Experimental Implementation of Fast Quantum Searching," Physical Review Letters, vol. 80, No. 15, Apr. 1998, pp. 3408–3411.*
D.P. DiVincenzo et al., "Results on two–bit gate design for quantum computers," 1994 Procs. Workshop on Physics and Computation, pp. 14–23.*
D.P. DiVincenzo, "Two–bit gates are universal for quantum computation," Physical Review A, vol. 51, No. 2, Feb. 1995, pp. 1015–1022.*
L.K. Grover, "A fast quantum mechanical algorithm for database search," STOC '96, pp. 212–219.*
L.K. Grover, "Quantum Mechanics Helps in Searching for a Needle in a Haystack," Physical Review Letters, vol. 79, No. 2, Jul. 1997, pp. 325–328.*
L.K. Grover, "Quantum Computation," Int'l Conference on VLSI Design, Jan. 1999, pp. 548–553.*

(Continued)

*Primary Examiner*—Leigh M. Garbowski
(74) *Attorney, Agent, or Firm*—Baker Botts L.L.P.

(57) ABSTRACT

A method for performing a data search includes initializing a collection of qubits by generating a superposition of quantum states in of the qubits, inverting the sign of a target quantum state, and calculating an inversion about the average for each qubit using one-bit unitary gates and two-bit quantum phase gates. The method further include iterating the inverting and calculating steps to determine a search result corresponding to the target quantum state according to Grover's algorithm.

22 Claims, 5 Drawing Sheets

OTHER PUBLICATIONS

L.K. Grover, "Quantum Mechanical Searching," Proc. of 1999 Congress on Evolutionary Computation, pp. 2255–2261.*

T. Hey, "Quantum computing an introduction," Computing & Control Engineering Journal, Jun. 1999, pp. 105–112.*

J.A. Jones et al., "Implementation of a quantum search algorithm on a quantum computer," Nature, vol. 393, May 1999, pp. 344–346.*

S. Lloyd, "Almost Any Quantum Logic Gate is Universal," Physical Review Letters, vol. 75, No. 2, Jul. 1995, pp. 346–349.*

A. Rauschenbeutel et al., "Coherent Operation of a Tunable Quantum Phase Gate in Cavity QED," Physical Review Letters, vol. 83, No. 24, Dec. 1999, pp. 5166–5169.*

Q.A. Turchette et al., "Measurement of Conditional Phase Shifts for Quantum Logic," Physical Review Letters, vol. 75, No. 25, Dec. 1995, pp. 4710–4713.*

W. Wang et al., "Multibit Gates for Quantum Computing," Physical Review Letters, vol. 86, No. 17, pp. 3907–3910.*

Barenco, Adriano, et al., "*Elementary gates for quantum computation*," The American Physical Society, Physical Review A, vol. 52, No. 5, © Nov. 1995, pp. 3457–3467.

Shor, Peter W., "*Polynomial–Time Algorithms for Prime Factorization and Discrete Logarithms on a Quantum Computer*," Proceedings of the 35th Annual Symposium on Foundations of Computer Science, *IEEE Computer Society Press,* SIAM Journal of Computing, © 1997, Copyright by the Society for Industrial and Applied Mathematics, pp. 1–25.

Grover, Lov K., "*Quantum Mechanics Helps in Searching for a Needle in a Haystack*," The American Physical Society, Physical Review Letters, vol. 79, No. 2, © Jul. 14, 1997, pp. 325–328.

Farhi, Edward, "*Analog analogue of a digital quantum computation*," The American Physical Society, Physical Review, A, vol. 57, No. 4, © Apr. 1998, pp. 2403–2406.

Jones, Jonathan A., "*Quantum Computing: Fast Searches with Nuclear Magnetic Resonance Computers*," Science Magazine, vol. 280, Issue 5361, http://www.sciencemag.org/cgi/content/full/280/5361/229,7 pages, Apr. 10, 1998.

Chuang, Isaac, L., et al, "*Experimental Implementation of Fast Quantum Searching*," The American Physical Society, Physical Review Letters, vol. 80, No. 15, © Apr. 13, 1998, pp. 3408–3411.

Jones, Jonathan A., et al., "*Implementation of a quantum search algorithm on a quantum computer*," Nature, vol. 393, Nature © Macmillan Publishers Ltd May 28,1998, pp. 344–346.

Lloyd, Seth, "*Quantum search without entanglement*," The American Physical Society, Physical Review A, Rapid Communications, vol. 61, © Dec. 8, 1999, pp. 010301-1–010301-4.

Rauschenbeutel, A., et al., "*Coherent Operation of a Tunable Quantum Phase Gate in Cavity QED*," The American Physical Society, Physical Review Letters, vol. 83, No. 24, © Dec. 13, 1999, pp. 5166–5169.

Kwiat, P.G., et al, "*Grover's search algorithm: an optical approach*," Journal of Modern Optics, 2000, ISSN 0950–0340; © 2000 Taylor & Francis Ltd., vol. 47, No. 2/3, pp. 257–266.

Ahn, J., et al, "*Information Storage and Retrieval Through Quantum Phase*," Science Magazine, Reports, vol. 287, www.sciencemag.org, pp. 463–465, Jan. 21, 2000.

Knight, Peter, "*Quantum Computing: Enhanced: Quantum Information Processing Without Entanglement*," Science Magazine, vol. 287, Issue 5452, http://www.sciencemag.org/cgi/content/full/287/5452/441, 15 pages, Jan. 21, 2000.

Scully, Marlan O., et al, "*Quantum optical implementation of Grover's algorithm*," PNAS, vol. 98, No. 17, pp. 9490–9493, Aug. 14, 2001.

* cited by examiner

QUANTUM CIRCUIT DESIGN FOR GROVER'S ALGORITHM

RELATED APPLICATIONS

This application claims the benefit of U.S. Provisional Application Ser. No. 60/329,698 filed Oct. 15, 2001.

GOVERNMENT FUNDING

The U.S. Government may have certain rights in this invention as provided for by the terms of QuIST Contract F49620-01-1-0566, Defense Advanced Research Project Agency.

TECHNICAL FIELD OF THE INVENTION

This invention relates generally to the field of circuit design and more specifically to a quantum circuit design for Grover's algorithm.

BACKGROUND OF THE INVENTION

Quantum computing utilizes unique quantum features such as quantum coherence and quantum entanglement to solve some problems much faster than on classical Turing machines. In a quantum circuit, information is stored in quantum bits or "qubits." An important difference between qubits and conventional bits is that rather than being restricted to one of the on and off states, the quantum properties of qubits allow them to maintain a state that is a superposition of both on and off states simultaneously. By exploiting quantum coherence properties between qubits, a collection of n qubits may store $2^n$ bits of information as opposed to the n pieces of information that may be stored by conventional bits.

The most dramatic example of the power of quantum computing is Shor's algorithm to factor a large integer. This algorithm is substantially faster than any known classical algorithm of subexponential complexity. Another major example is the search for an object in unsorted data containing N elements. Classically it would require, on the average, O(N) searches. However, Grover showed that, by employing quantum superposition and quantum entanglement, the search can be carried out with only $O(\sqrt{N})$ steps. Grover's algorithm thus represents a polynomial advantage over classical counterparts.

In recent years, Grover's algorithm has been realized in nuclear magnetic resonance, and optical systems, and a proposal has been made for its implementation in cavity quantum electrodynamic systems. All these studies are, however, restricted to searching N=2 qubits for which only one step is required to recover the target state with unit probability. An extension to higher values of N entails additional complications.

SUMMARY OF THE INVENTION

A quantum circuit design for Grover's algorithm is disclosed. According to one embodiment of the present invention, a method for performing a data search includes initializing a collection of qubits by generating a superposition of quantum states in each of the qubits, inverting the sign of a target quantum state, and calculating an inversion about the average for each qubit using one-bit unitary gates and two-bit quantum phase gates. The method further include iterating the inverting and calculating steps to determine a search result corresponding to the target quantum state according to Grover's algorithm.

According to another embodiment of the present invention, a device for performing a data search includes an initialization block, a write block, and a search block, each made up of a collection of circuits. The initialization block generates a superposition of quantum states in a collection of qubits. The write block inverts the sign of a target quantum state maintained on the qubits. The search block calculates an inversion about the average to determine a search result according to Grover's algorithm, the search result corresponding to the target quantum state of the target qubit.

Important technical advantages of certain embodiments of the present invention include more rapid searching of a database. Grover's algorithm exploits quantum entanglement properties resulting from storing information in qubits linked by quantum coherence. Thus, by implementing Grover's algorithm to search information stored in qubits, information may be located and retrieved from the database at a polynomially faster average rate.

Other important technical advantages of certain embodiments of the present invention include extending the application of Grover's algorithm to an arbitrary number of qubits using the basic building blocks of one-bit unitary gates and two-bit quantum phase gates. Since both one-bit and two-bit gates have been observed experimentally, certain embodiments of the present invention allow Grover's algorithm to be applied to any number of qubits using existing building blocks of quantum computing.

These technical advantages may be realized by some, all, or none of the described embodiments of the present invention. Other technical advantages certain embodiments of the present invention will be readily apparent to one skilled in the art from the following figures, descriptions, and claims. Although particular technical advantages of certain embodiments have been enumerated, various embodiments may include some, all, or none of the enumerated advantages. In particular, any set of elementary quantum gates that are well known in quantum computing may be equivalent to the 1-bit unitary gates and 2-bit quantum phase gates here. Thus they may be used to design a quantum circuit to perform quantum search using the same principles of design as described here.

DETAILED DESCRIPTION OF THE DRAWINGS

Figure 1:
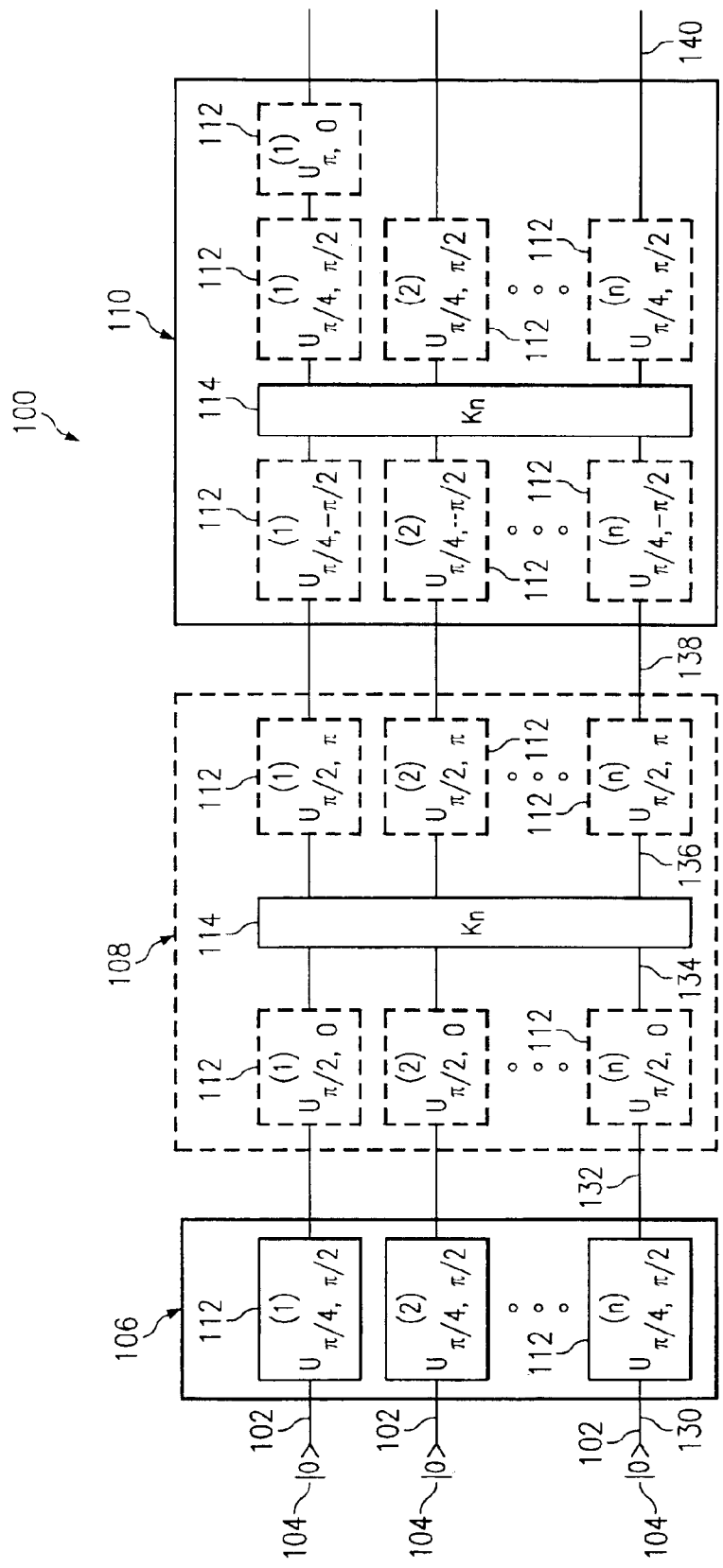
FIG. 1 shows a data search device according to a particular embodiment of the present invention.

FIG. 1 shows one embodiment of a data search device 100 for searching information stored in qubits 102 as quantum state information 104. Qubits 102 are molecules, particles, or other systems that can maintain information as a superposition of quantum states, referred to as quantum state information 104. For example, a particle may exist in a simultaneous superposition of the spin-up and spin-down states, unlike a conventional bit, which must either be on or off. By exploiting quantum coherence properties of quantum state information 104 in a collection of qubits 102, the amount of information that may be stored as quantum state information 104 in qubits 102 may be exponentially larger than the amount of information stored in conventional bits. Examples of qubits 102 have been demonstrated in nuclear magnetic resonance systems, described in Chuang et al. in Physics Review Letters 80, 3408 (1998) and Jones et al. in Nature (London) 393, 344 (1998), and optical systems, described by Kwiat et al. in Optics 47, 257 (1999). In addition, implementations of qubits 102 in cavity quantum electrodynamic systems have also been proposed. A plurality of qubits 102 associated with respective quantum state information 104 is shown as entering an initialization block 106. The number of qubits 102 depends on the scope of quantum coherence between qubits 102, which is in turn dictated by physical constraints of the quantum system. In a two-state system, qubits 102 may store $2^n$ pieces of information, where n is the number of qubits 102 in the system.

Data search device 100 includes initialization block 106, a write block 108, and a search block 110. Overall, data search device 100 performs searches, including data mining or other suitable information retrieval, on information stored in quantum states using Grover's algorithm, which exploits quantum entanglement properties of information to search stored information. In databases that can be searched by Grover's algorithm, the average number of searches required to locate information is on the order of the square root of the number of searched items, as opposed to conventional searches, which require an average number of searches on the order of the number of searched items.

Although Grover's algorithm has been previously demonstrated in nuclear magnetic resonance (NMR) systems, optical systems, and cavity quantum electrodynamic (QED) systems, such systems have presently been limited to performing the search in 2-qubit systems, which only require one step to recover a target state with unit probability. This limits such systems to searching $2^2=4$ bits of information. In contrast, the teachings of the present invention recognize that Grover's algorithm may be implemented in a quantum circuit utilizing currently-existing quantum computing building blocks as described in detail below. According to one embodiment, data search device 100 provides an implementation of Grover's algorithm for performing such a search that is extendable to an arbitrary number of qubits 102 using one-bit unitary gates and two-bit quantum phase gates. One-bit unitary gates are well-known in quantum computing, and two-bit quantum phase gates have been experimentally demonstrated in the particular case of cavity QED, as described by Rauschenbeutel et al. in Physical Review Letters 83, 5166 (1999) and Turchette et al. in Physical Review Letters 75, 4710 (1995). Thus, data search device 100 embodies a method for implementing Grover's algorithm for an arbitrary number of qubits 102 using known building blocks of quantum computing, namely one-bit unitary gates and two-bit phase gates.

To describe the mathematical operation of data search device 100, it is useful to discuss some basic background on the nature of Grover's algorithm and the mathematical properties of the one-bit unitary and two-bit quantum phase gates.

I. Description Of Mathematical Operation

Grover's algorithm may be summarized as follows. For the ease of quantum network representation, the following convention is adopted: matrix representations are always with reference to the binary string basis in increasing lexicographic order:

$$|00\ldots00\rangle, |00\ldots01\rangle, |00\ldots010\rangle, \ldots, |11\ldots10\rangle, |11\ldots11\rangle, \quad (I.1)$$

or the $2^n$ dimensional Hilbert space H. Without loss of generality, it is assumed that $N=2^n$.

To provide a brief summary of the mathematical formalism of Grover's algorithm, let $$D=\{w_i/i=0,1,\ldots,N-1\} \quad (N=2^n) \quad (I.2)$$

be a database, which is encoded in an n-bit quantum computer as $$\hat{D}=\{|w_i\rangle/i=0,1,\ldots,N-1\}, \text{ with } H=\text{span } \hat{D}.$$

Without loss of generality, assume that $|w_0\rangle$ is the intended (unknown) search target in $\hat{D}$. Associated with this target $|w_0\rangle$, the only information available is through a black-box oracle function $$f:\hat{D}\to\{0,1\}; f(|w_i\rangle)=\delta_{i0}, i=0,1,\ldots N-1. \quad (I.3)$$

Let the binary symbol for $|w_0\rangle$ be $$|w_0\rangle=|a_1 a_2 \ldots a_n\rangle, a_i \in \{0,1\}, i=1,2,\ldots,n. \quad (I.4)$$

For future needs, (I.4) is represented as $$|w_0\rangle=\sigma_x^{(i1)}\sigma_x^{(i2)}\ldots\sigma_x^{(ik)}|11\ldots11\rangle, \quad (I.5)$$

where $$\sigma_x^{(j)} = \begin{bmatrix} 0 & 1 \\ 1 & 0 \end{bmatrix}, \quad j=i_1, i_2, \ldots, i_k, \quad (I.6)$$

is a Pauli matrix (or, the XOR-gate) acting on the j-th qubit, i.e., in (I.4), $a_j=0$ for $j=i_1, i_2, \ldots, i_k$. All the other $a_j$'s are 1.

Let $$|s\rangle = \frac{1}{\sqrt{N}} \sum_{i=0}^{N-1} |w_i\rangle$$

be the uniform superposition of all basis states in H. The following is defined $$I_{w_0} = I - \frac{1}{2}\sum_{i=0}^{N-1}[|w_i\rangle - (-1)^{f(|w_i\rangle)}|w_i\rangle][\langle w_i| - (-1)^{f(|w_i\rangle)}\langle w_i|] \quad (I.7)$$

$$= I - 2|w_0\rangle\langle w_0|, \text{ and}$$

$$I_s = I - 2|s\rangle\langle s| \text{ (inversion about the average)} \quad (I.8)$$

Both $I_{w_0}$ and $I_s$ are unitary operators, and $$G \equiv -I_s I_{w_0} \quad (I.9)$$

is Grover's unitary operator to be used in the iterative search for $|w_0\rangle$. Using $|s\rangle$ as the initial state, and applying the operator G, k times, i.e., $$G^k|s\rangle, \quad k \approx \frac{\pi}{4}\sqrt{N}, \quad (I.10)$$

$|w_0\rangle$ is obtained with a high probability (close to 1).

Due to the coherent nature of quantum mechanics, quantum computing algorithms are based on unitary transformations. The one-bit unitary gate and two-bit quantum phase gate are the basic building blocks for quantum algorithms. The design circuit elements are based on the following gates that are representable in matrix forms as:

(i) one-bit unitary gate $$U_{\theta,\phi}^{(j)} = \begin{bmatrix} \cos\theta & -ie^{-i\phi}\sin\theta \\ -ie^{i\phi}\sin\theta & \cos\theta \end{bmatrix},$$

with respect to the ordered basis $\{|0\rangle, |1\rangle\}$; (The superscript (j) here denotes that this operation is on the j-th bit.) (I. 11)

(ii) two-bit phase gate $$Q_n = e^{i\eta\delta_{\alpha 1}\delta_{\beta 1}}$$

$$= \begin{bmatrix} 1 & 0 & 0 & 0 \\ 0 & 1 & 0 & 0 \\ 0 & 0 & 1 & 0 \\ 0 & 0 & 0 & e^{i\eta} \end{bmatrix}, \text{ with respect to the ordered basis}\{|00\rangle, |01\rangle, |10\rangle, |11\rangle\}.$$

(I.12)

The basic quantum gates (I.11) and (I.12) are universal for $n \geq 2$. Therefore, this assures that a quantum circuit design can be made. The complexity of the design, measured in terms of the total number of elementary quantum gates (I.11) and (I.12) needed in a single Grover search iteration, is O(log N), where N is the size of the database.

Turning now back to FIG. 1, FIG. 1 shows that initialization block 106, write block 108, and search block 110 each include unitary gates 112, shown as blocks labelled $U_{\theta_1,\phi_1}^{(i)}$, and write block 108 and search block 110 also include $K_n$ key transformations 114. Initialization block 106, write block 108, and search block 110 may also include any additional circuitry, implemented in software, electronic or quantum form, for performing ancillary functions described herein. Unitary gates 112 represent any quantum circuitry, including magnetic, electrical, optical or other suitable components, able to perform a unitary gate operation, as shown in (I.11), on the state of any qubit 102 to which unitary gate 112 is applied. Each unitary gate 112 operates on quantum states 104 of one qubit 102, given by the superscript i of $U_{\theta_1,\phi_1}^{(i)}$. The subscripts specify the values for the parameters $\theta$ and $\phi$ in the unitary gate operation (I.11). The particular form that unitary gates 112 take will depend on the particular quantum environment (e.g., NMR, cavity QED, optical) that is used to produce qubits 102. The superscripts on each unitary gate 112 refer to the bit number to which the unitary gate 112 is applied, while the subscripts specify the values for the parameters $\theta$ and $\phi$ in the unitary gate operation (I.11). The dashed lines used to draw unitary gates 112 in write block 108 indicate that these gates may be activated selectively by a subroutine of write block 108, so that they may be applied to all, some, or none of the states maintained by qubits 102.

Figure 2:
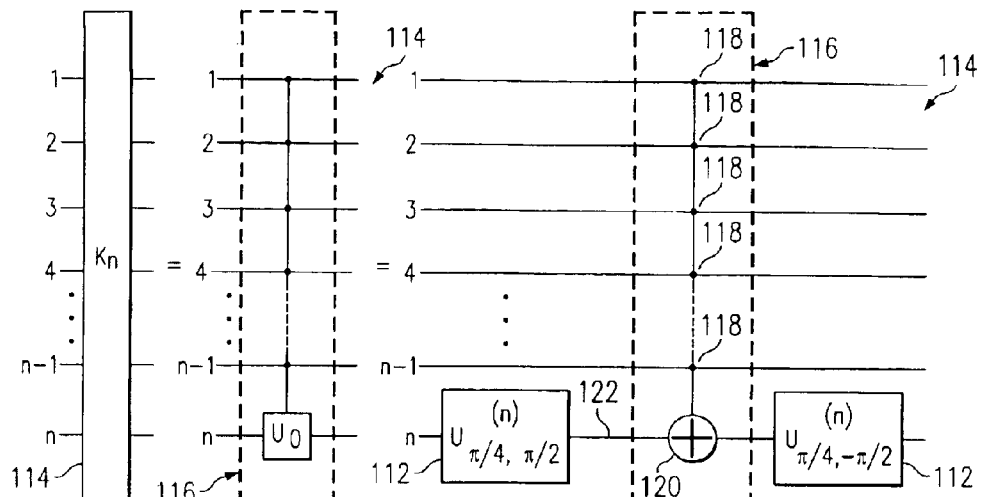
FIG. 2 shows one embodiment of a $K_n$, key transformation in the data search device.

$K_n$ key transformation 114 (subsequently referred to as $K_n$ 114) represents quantum circuitry, including magnetic, electrical, optical, or other suitable components that inverts the sign of a target quantum state of a target qubit 102. $K_n$ 114 is illustrated in greater detail in FIG. 2. FIG. 2 is a quantum circuit schematic that shows the functional components of $K_n$ 114. Referring to FIG. 2, $K_n$ 114 includes unitary gates 112 and an inversion operator 116. The inversion operator 116 performs a NOT operation 120, inversion of the sign, on a controlled bit 122 corresponding to qubit 102n when activated by input bits 118. In a particular embodiment, $K_n$ 114 is controlled by input bits 118 such that when $K_n$, 114 acts on a qubit 102 having a state of the form $|11 \ldots 11\rangle$, the inversion operator 116 performs a NOT operation 120 on controlled bit 122; otherwise, $K_n$ 114 does not invert the sign of controlled bit 122. The unitary gates 112 in write block 108 may be selectively activated to change the selected quantum state to $|11 \ldots 11\rangle$, so that it will be inverted. The precise mathematical operation of $K_n$ 114 and methods for constructing $K_n$ 114 from one-bit unitary gates and two-bit quantum phase gates are discussed in more detail in conjunction with FIGS. 4A–4G and FIG. 5 below.

Figure 3:
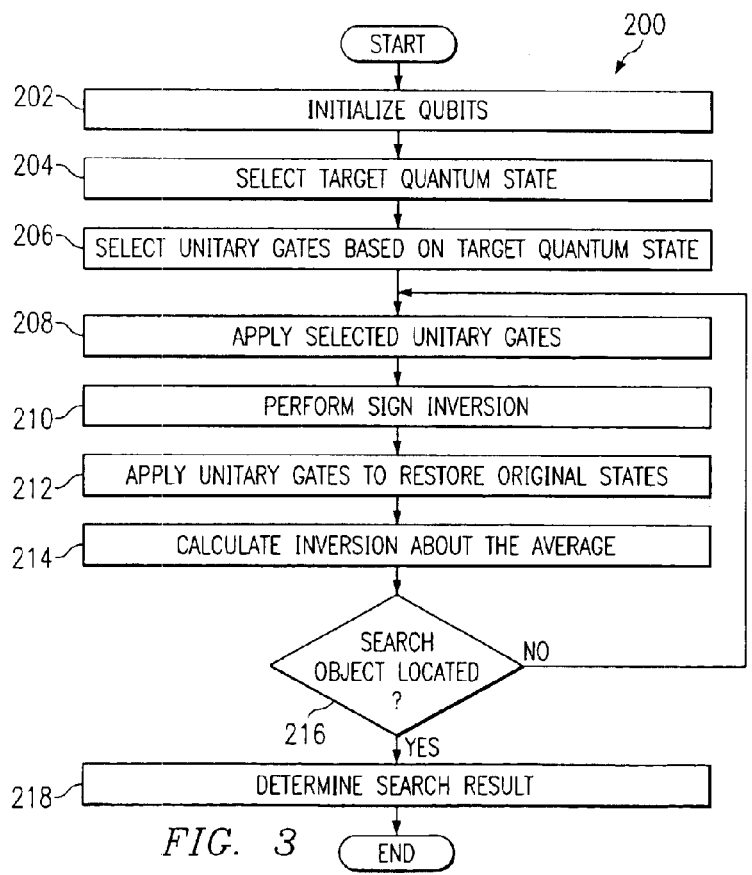
FIG. 3 is a flow chart showing the operation of data search device.

FIG. 3 is a flow chart 200 showing the operation of data search device 100 for a two-state quantum system. All qubits 102 begin in the default state $|0\rangle$ (state 130 in FIG. 1). Initialization block 106 initializes the qubits 102 by preparing a superposition of quantum states 104 (state 132 in FIG. 1) in each qubit 102 at step 202. This superposition 132 is generated by unitary gates 112 of initialization block 106. The superposition 132 is then provided to write block 108. Write block 108 selects a target state 104 maintained on the collection of qubits 102 to be inverted, which effectively selects a memory location to be "written," at step 204. Based on the target state 104 selected, write block 204 selectively activates unitary gates 112 that convert the target state of superposition 132 into the state 134 that $K_n$ 114 inverts at step 206. This selection is performed by circuitry in write block 108, which may be a software subroutine, quantum circuit, or any other suitable technique of controlling unitary gates 112. At step 208, write block 108 applies the selected unitary gates 112 of write block 108 to the superpositions 132, producing state 134 in FIG. 1. $K_n$ 114 of write block 108 then inverts the sign of the converted target state 134 at step 210, producing state 136 in FIG. 1. Write block 108 then uses unitary gates 112 to restore state 136 back to its original state 132 but preserving the sign change at step 212, thus producing inverted state 138 in FIG. 1.

To search for the inverted sign, search block 110 calculates an inversion about the average on qubits 102 at step 214, resulting in state 140 in FIG. 1. This is performed by the combination of unitary gates 112 and key transformation 114 shown in FIG. 1. Search block 110 then determines whether the inverted sign has been located at step 216. If the target state has not been located, search block 110 iteratively repeats the method from step 208 until the search result is located, which on average requires a number of searches on the order of the square root of the number of qubits 102. Once the inverted sign is located, search block 110 determines a search result corresponding to the location of the inverted sign at step 218.

Although this summarizes the basic operation of data search device 100, it is useful to note that $K_n$ 114 can be constructed for an arbitrary number of qubits 102 using one-bit unitary gates and two-bit quantum phases gates. Furthermore, it is notable that the operation of $K_n$ 114 corresponds to Grover's algorithm. Therefore, the following sections describe the construction of the $K_n$ 114 using one-bit unitary and two-bit quantum phase gates and explain the mathematical details of the operation of $K_n$. Section II shows the construction of a three-bit key transformation $K_3$ from one-bit and two-bit gates. Section III illustrates the construction of an n-bit key transformation from $K_3$. Finally, Section IV shows that the mathematical operation of the components of FIG. 1 corresponds to Grover's algorithm.

II. Construction of the Toffoli Gate and $K_3$ from the Basic Gates

As a first step towards a design for data search device 100 using one-bit unitary gates and two-bit quantum phase gates, the 3-bit key transformation $K_3 = I - 2|111\rangle\langle 111|$ is constructed from the one-bit unitary gates and the two-bit quantum phase gates. A unitary matrix is introduced:

$$U = \begin{bmatrix} u_{00} & u_{01} \\ u_{10} & u_{11} \end{bmatrix}.$$

The operator $\Lambda_m(U)$ on (m+1)-qubits (with M=0,1,2, ... ) is defined through its action on the basis by $$\Lambda_m(U)(|x_1 \ldots x_m y\rangle) = \begin{cases} |x_1 \ldots x_m y\rangle & \text{if } \wedge_{k=1}^m x_k = 0 \\ u_{0y}|x_1 \ldots x_m 0\rangle + u_{1y}|x_1 \ldots x_m 1\rangle & \text{if } \wedge_{k=1}^m x_k = 1. \end{cases}$$

where "$\wedge$" denotes the Boolean operator AND.

Figure 4A:
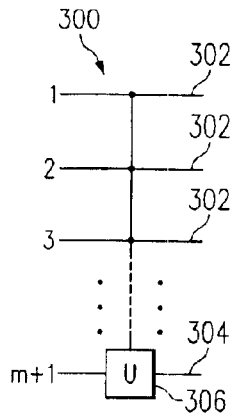
FIGS. 4A–4G illustrate equivalent networks for selected components of a quantum circuit according to one embodiment of the present invention.

The matrix representation for $\Lambda_m(U)$ is $$\Lambda_m(U) = \begin{bmatrix} I & & & & 0 \\ & \ddots & & & \\ & & \ddots & & \\ & & & I & \\ 0 & & & & \begin{bmatrix} u_{00} & u_{01} \\ u_{10} & u_{11} \end{bmatrix} \end{bmatrix}_{2^{m+1} \times 2^{m+1}} \quad (\text{II}.1)$$

and the network notation 300 is shown in FIG. 4A. The first m wires from the top in FIG. 4A represent control bits 302, while the (m+1)-th bit is a controlled bit 304. The operation of the unitary matrix is shown by block 306 on the controlled bit 304.

Figure 4B:
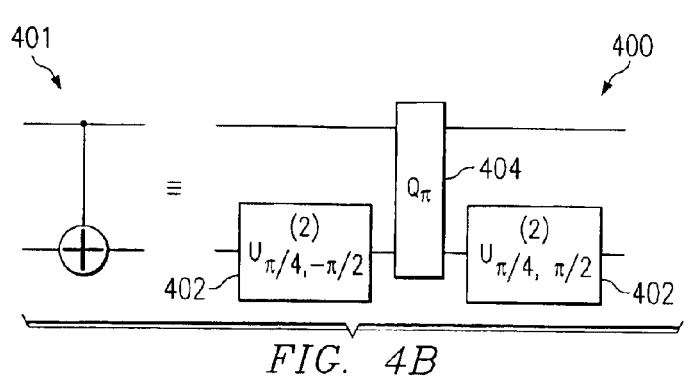

FIG. 4B shows an equivalent network 400 for the Controlled-NOT operator 401 using unitary gates 402 and a quantum phase gate 404. X is used to denote the NOT-gate $\sigma_x$ in (I.6). Then $\Lambda_1(X)$ and $\Lambda_2(X)$ are, respectively, the well known Controlled-NOT gate 401 and the Toffoli gate. The Controlled-NOT gate 402 can be derived from a quantum phase gate via $$\Lambda_1(X) = U_{\pi/4,\pi/2}^{(2)} Q_\pi U_{\pi/4,-\pi/2}^{(2)} \quad (\text{II}.2)$$

This may be observed by writing the following matrix representations with respect to the ordered basis $\{|00\rangle, |01\rangle, |10\rangle, |11\rangle\}$, $$\Lambda_1(X) = \begin{bmatrix} 1 & 0 & 0 & 0 \\ 0 & 1 & 0 & 0 \\ 0 & 0 & 0 & 1 \\ 0 & 0 & 1 & 0 \end{bmatrix}, \quad U_{\pi/4,-\pi/2}^{(2)} = \begin{bmatrix} \frac{1}{\sqrt{2}} & \frac{1}{\sqrt{2}} & 0 & 0 \\ -\frac{1}{\sqrt{2}} & \frac{1}{\sqrt{2}} & 0 & 0 \\ 0 & 0 & \frac{1}{\sqrt{2}} & \frac{1}{\sqrt{2}} \\ 0 & 0 & -\frac{1}{\sqrt{2}} & \frac{1}{\sqrt{2}} \end{bmatrix},$$

$$Q_\pi = \begin{bmatrix} 1 & 0 & 0 & 0 \\ 0 & 1 & 0 & 0 \\ 0 & 0 & 1 & 0 \\ 0 & 0 & 0 & -1 \end{bmatrix}, \quad U_{\pi/4,-\pi/2}^{(2)} = \begin{bmatrix} \frac{1}{\sqrt{2}} & -\frac{1}{\sqrt{2}} & 0 & 0 \\ \frac{1}{\sqrt{2}} & \frac{1}{\sqrt{2}} & 0 & 0 \\ 0 & 0 & \frac{1}{\sqrt{2}} & -\frac{1}{\sqrt{2}} \\ 0 & 0 & \frac{1}{\sqrt{2}} & \frac{1}{\sqrt{2}} \end{bmatrix}.$$

It can be verified by matrix multiplication that (II.2) hold, and that the equivilant in FIG. 4B therefore holds.

Figure 4C:
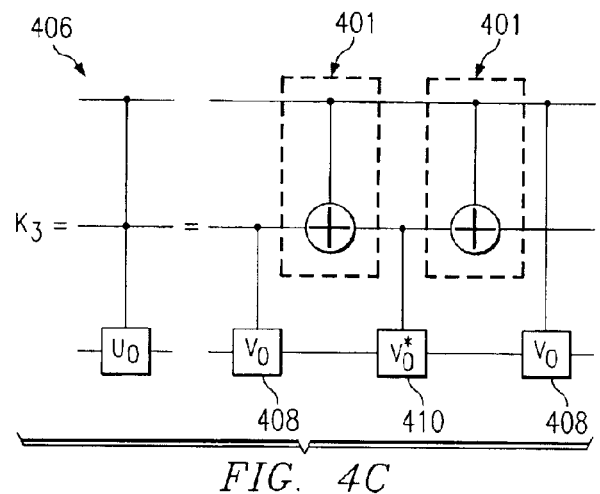
Figure 4D:
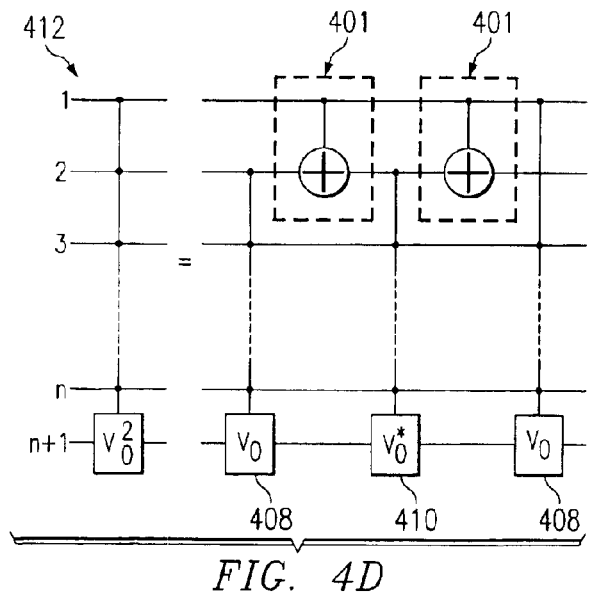

FIGS. 4C and 4D show equivalent networks for important matrix operations. FIG. 4C shows an equivalent network 406 for the $K_3$ key transformation, using Controlled-NOT gates 401 and mathematical operations $V^*_0$ 408 and $V^*_0$ 410, with the following definitions:

$$U_0 \equiv \begin{bmatrix} 1 & 0 \\ 0 & -1 \end{bmatrix}, \quad V_0 = \begin{bmatrix} 1 & 0 \\ 0 & i \end{bmatrix}, \quad V_0^* = \begin{bmatrix} 1 & 0 \\ 0 & -i \end{bmatrix}, \quad (\text{II}.3)$$

Figure 4E:
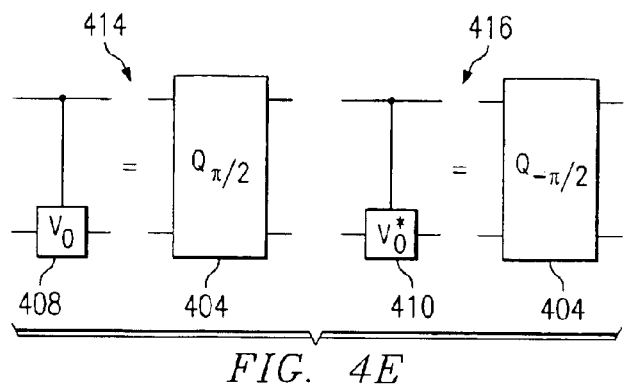

It may be shown based on these definitions that the unitary transformation $K_3 = I - 2|111\rangle\langle 111| = \hat{\Lambda}_2(U_0)$ can be simulated by the network depicted in FIG. 4C. FIG. 4D shows an equivalent network 412 for the (n+1)-bit gate $\Lambda_n(U_0)$ FIG. 4E shows the equivalent networks for mathematical operators $V_0$ 408 and $V^*_0$ 410. Networks 414 and 416 each perform their respective mathematical operations using a single two-bit quantum phase gate 404. The mathematical equivalence of networks 414 and 416 to their respective operators may be shown using the definition of phase gate Q 404 and from the equivalencies demonstrated above.

Figure 4F:
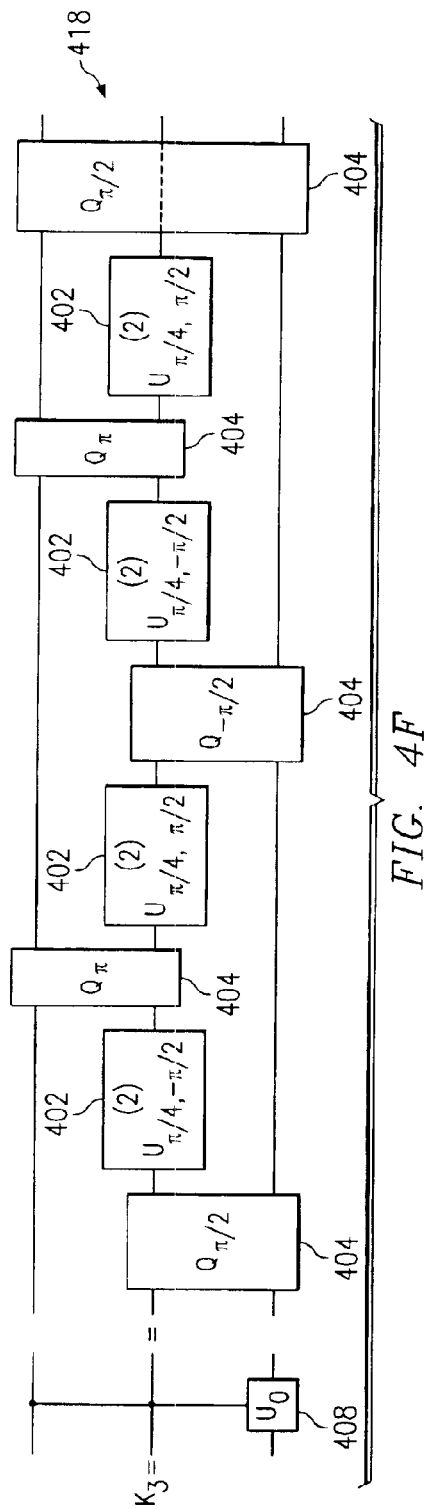
Figure 4G:
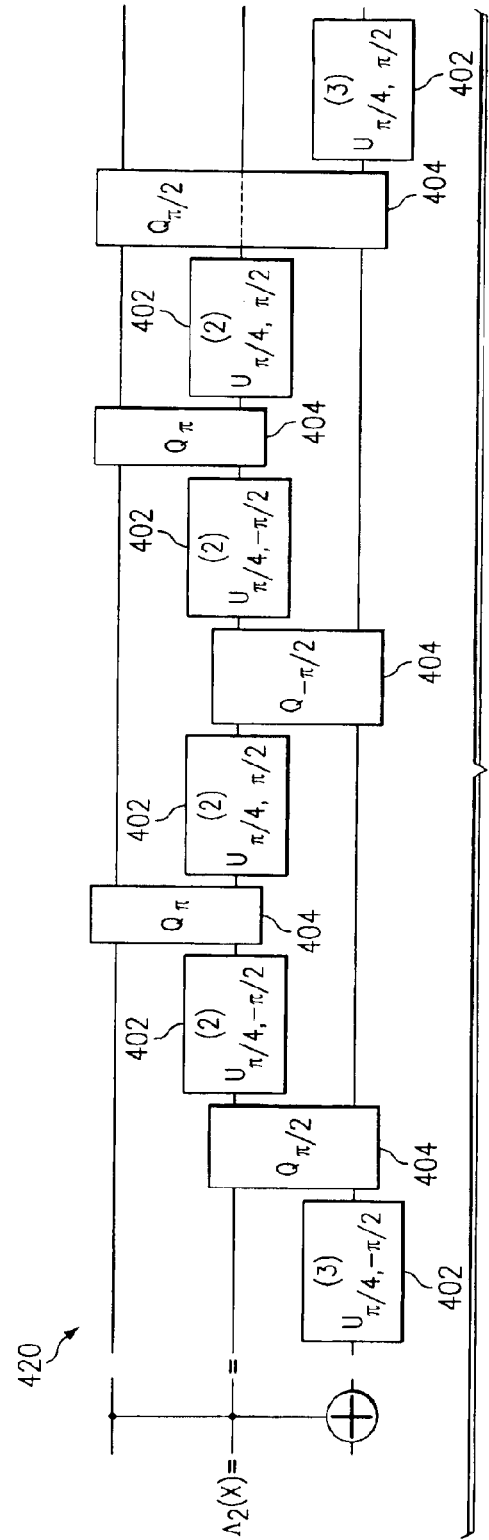

It then follows, on using FIGS. 4B and 4E in FIG. 4C, that the key transformation $K_3$ can be simulated by the network in terms of the basic $U_{\theta,\phi}$ gates 402 and $Q_{72}$ gates 404. FIG. 4F depicts the equivalent network 418. The Toffoli gate $\Lambda_2$ (X) can be simulated by the network in terms of the basic $U_{\theta,\phi}$ gates 402 and $Q_\eta$ gates 404, as depicted by equivalent network 420 in FIG. 2G. From FIG. 2G, it can be determined that, to make a Toffoli gate, 11 basic gates as used: 6 $U_{\theta,\phi}$ one-bit gates 402 and 5 $Q_\eta$ two-bit phase gates 404.

Figure 5:
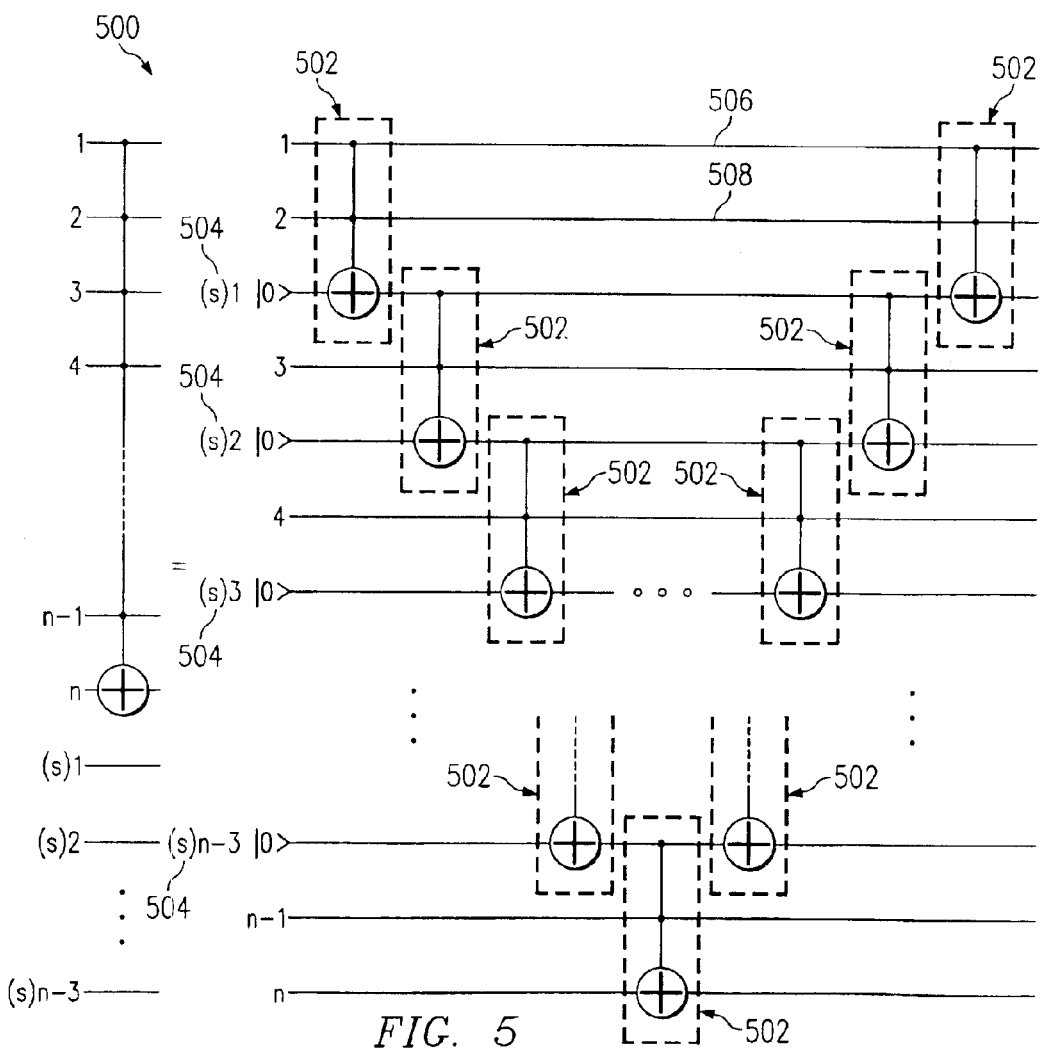
FIG. 5 shows a construction of an n-bit transformation $\hat{\ }_{n-1}(X)$ using 2n–7 Toffoli gates and n-3 scratch bits (s)1, (s)2, . . . (s)n–3.

III. Construction of the N-Bit Key Transformation with Linear Complexity from the Basic Gates FIG. 5 shows the n-bit gate $\Lambda_{n-1}$ (X) simulated by a network 500 that includes 2n−7 Toffoli gates 502, where n−3 scratch bits 504, (s)1, (s)2, ... , (s)$_n$−3, are used. This can be shown as follows.

Except for the two Toffoli gates $\Lambda_2$ (X) 502 controlled by bits 1 and 2 (see the top two wires 506 and 508), every $\Lambda_2$ (X) 502 else is controlled by the scratch bits 504 (s)j,j=1,2, ... , n−3 with the value $|0\rangle$ prescribed. Hence, if there is any $|1\rangle$ appearing in any one of the input qubits 1,2, ... , n−1, the $\Lambda_2$ (X) gate 502 controlled by that input bit will act trivially on the scratch bit 504, (s)j, which is the controlled bit, leaving its value equal to $|0\rangle$ throughout that wire. This affects the functioning of the $\Lambda_2$ (X) gate 502 controlled by the scratch bit 504, again leaving the value of the next scratch bit 504, (s)j+1, to be $|0\rangle$ unchanged. This process carries on to the very last scratch bit 504, (s)n−3.

Since $(s)n-3$ is a control bit for bit n, the value of bit n is unchanged. Only when all of the input qubits take the value $|1\rangle$, will all the $\Lambda_2$ (X) gates 502 act nontrivially, flipping the value of the $(s)j$ bit from $|0\rangle$ to $|1\rangle$, and then from $|1\rangle$ back to $|0\rangle$ on the remaining part of the $(s)j$ wire, for $j=1,2,\ldots,n-3$. Hence the $\Lambda_{n-1}$ (X) transformation is accomplished.

As a consequence, it can be verified that the n-bit key transformation $K_n$(I.13) can be simulated by the network as shown in FIG. 2.

An interesting question relates to the number of quantum logic gates that are required to implement the key transformation $K_n$. It follows from the above discussion that the minimum number of gates is at most $(2n-7)\times 5=10n-35 Q_{72}$ gates $(2n-7)\times 6+2=12n-40 U_{\theta,\phi}$ gates, for a total of $22n-75$ basic gates. Hence, there is a linear complexity as far as n is concerned.

As a preliminary matter to explaining the operation of $K_n$ in conjunction with one-bit unitary gates, it is also useful to demonstrate the commutativity of unitary gates acting on different target qubits 102. Assume that $i \neq j$, $1 \leq i, j \leq n$ (i.e., the unitary gates act on different qubits 102). The commutativity relationship may be stated as $$U_{\theta_1,\phi_1}^{(i)} U_{\theta_2,\phi_2}^{(j)} = U_{\theta_2,\phi_2}^{(j)} U_{\theta_1,\phi_1}^{(i)}. \tag{III.1}$$

Intuitively, this seems reasonable because $U_{\theta_1,\phi_1}^{(i)}$ "acts only on the i-th bit" while $U_{\theta_2,\phi_2}^{(j)}$ "acts only on the j-th bit". A short proof is provided mainly for the benefits of researchers who are not physicists and who demand more mathematical rigor. Without loss of generality, it is assumed that $i<j$. Any typical basis element in H is in one of the following four forms:

$|e_1\rangle \equiv |a_1 \ldots a_{i-1} 0 a_{i+1} \ldots a_{j-1} 0 a_{j+1} \ldots a_n\rangle$,
$|e_2\rangle \equiv |a_1 \ldots a_{i-1} 0 a_{i+1} \ldots a_{j-1} 1 a_{j+1} \ldots a_n\rangle$,
$|e_3\rangle \equiv |a_1 \ldots a_{i-1} 1 a_{i+1} \ldots a_{j-1} 0 a_{j+1} \ldots a_n\rangle$,
$|e_4\rangle \equiv |a_1 \ldots a_{i-1} 1 a_{i+1} \ldots a_{j-1} 1 a_{j+1} \ldots a_n\rangle$, where each $a_f \in \{0,1\}$ for $l \neq i,j$. Then for $|e_1\rangle$, it follows that $U_{\theta_1,\phi_1}^{(i)} U_{\theta_2,\phi_2}^{(j)} |e_1\rangle = U_{\theta_2,\phi_2}^{(j)} U_{\theta_1,\phi_1}^{(i)} |e_1\rangle$ $= \cos\theta_1 [\cos\theta_2 |e_1\rangle - ie^{i\phi_2}\sin\theta_2 |e_2\rangle -$ $ie^{i\phi_1}\sin\theta_1 [\cos\theta_2 |e_3\rangle - ie^{i\phi_2}\sin\theta_2 |e_4\rangle]$.

For $|e_2\rangle$, $|e_3\rangle$ and $|e_4\rangle$, (III.1) may be validated.

IV. Demonstrating that the Operation Of Data Search Device 100 Corresponds to Grover's Algorithm Turning now back to FIG. 1, the operation of blocks of data search device 100 may be explained in terms of the mathematical operation of each block. Initialization block 106 represents one or more circuits, including any suitable electronic, optic or other quantum circuitry component, that generates a superposition of quantum states 104 in qubit 102 when applied to qubits 102 in the ground state. In one embodiment, initialization block 106 is a Walsh-Hadamard (W) block 106, which performs the transformation:

$$|00 \ldots 0\rangle \rightarrow |s\rangle = \frac{1}{\sqrt{N}} \sum_{i=0}^{N-1} |w_i\rangle; \tag{IV.1}$$

The operation of the W block 106 may be demonstrated as follows. Recall that $$U_{\pi/4,\pi/2} |0\rangle = \frac{1}{\sqrt{2}}[|0\rangle + |1\rangle]. \tag{IV.2}$$

There the application of the unitary operator $U_{\pi/4,\pi/2}$ on each qubit 102 leads to a superposition of $2^n$ possible states 104, i.e., $$U_{\pi/4,\pi/2}^{(1)} |0\rangle \otimes U_{\pi/4,\pi/2}^{(i)} |0\rangle \otimes \ldots \otimes U_{\pi/4,\pi/2}^{(n)} |0\rangle = \frac{1}{2^{n/2}}[|00 \ldots 00\rangle + \tag{IV.3}$$

$|00 \ldots 01\rangle +$ $|00 \ldots 10\rangle +$ $|00 \ldots 11\rangle + \ldots +$ $|11 \ldots 10\rangle +$ $|11 \ldots 11\rangle]$ $= |s\rangle.$ Once the superposition of quantum states 104 is thus generated on each qubit 102, information may be stored on qubits 102 by flipping the sign of a target state maintained by qubits 102. This is the function of write block 108.

Write block 108 represents one or more circuits, including any suitable electronic, optical, or other quantum circuitry components, that invert the sign of a target state 104 maintained on qubits 102, such that $|w_i\rangle \rightarrow (-1)^{f(w_i)} |w_i\rangle$, $i=0,1,\ldots,N-1$; cf.(I.7). (IV.4)

By inverting the sign of the target state 104, write block 108 stores detectable information on qubits 102. In a particular embodiment, write block 108 is an oracle (O) block 108. The operation of O block 108 may be demonstrated as follows. Let $|w_0\rangle$ be given by (I.4) satisfying (I.5). Then, $U_{\pi/2,\pi}^{(i1)} U_{\pi/2,\pi}^{(i2)} \ldots U_{\pi/2,\pi}^{(i2)} K_\pi U_{\pi/2,0}^{(i1)} U_{\pi/2,0}^{(i2)} \ldots U_{\pi/2,0}^{(ik-1)} U_{\pi/2,0}^{(ik)} = I_{w_0}.$ (IV.5)

Here, for given $|w_0\rangle$ satisfying (I.3)–(I.5) (known only to the oracle), the one-bit unitary gates $U_{\pi/2,0}^{(i1)}, U_{\pi/2,\pi}^{(i1)}, U_{\pi/2,0}^{(i2)}, U_{\pi/2,\pi}^{(i1)}, \ldots, U_{\pi/2,0}^{(ik)}, U_{\pi/2,\pi}^{(i1)}$ are selected and activated by an oracle subroutine and transmitted to O block 108, yielding the unitary operator $I_{w_0}$.

Before giving a mathematical proof, this operation may be physically interpreted as follows. The role of the key transformation $K_n$ is to flip the phase of the state $|11 \ldots 11\rangle$. However, the target state w0 may have 1's and 0's at various locations. What the oracle does is to first apply the unitary transformation $U_{\pi/2,\pi}$ to all those qubits that are 0 in the target state, thus converting it into $|11 \ldots 11\rangle$. The other states in the superposition are also appropriately shifted. Now the operation $K_n$ shifts the phase of the target state. This is followed by the inverse unitary transformation $U_{\pi/2,0}$ to restore the 0's back to the original position in the target state. The net result is that the phase of the target state is shifted by $\pi$.

Now a rigorous mathematical proof of the oracle transformation is given in (IV.4). Note that $$U_{\pi/2,0} = \begin{bmatrix} 0 & -i \\ -i & 0 \end{bmatrix} = -i\sigma_x \qquad (IV.6)$$

$$U_{\pi/2,\pi} = \begin{bmatrix} 0 & i \\ i & 0 \end{bmatrix} = -i\sigma_x = U^*_{\pi/2,0}.$$

(Note that in the derivation of (IV.6), the following property is utilized:

$$U_{\pi/2,0}^{(i1)} U_{\pi/2,0}^{(i2)} \ldots U_{\pi/2,0}^{(ik)} I U_{\pi/2,\pi}^{(ik)} U_{\pi/2,\pi}^{(ik-1)} \ldots U_{\pi/2,\pi}^{(i1)} = I.)$$

Therefore, by (I.4) and (I.5), $$|w_0\rangle = \left(iU_{\pi/2,0}^{(i_1)}\right)\left(iU_{\pi/2,0}^{(i_2)}\right) \ldots \left(iU_{\pi/2,0}^{(i_k)}\right)|11 \ldots 1\rangle \qquad (IV.7)$$

$$= i^k U_{\pi/2,0}^{(i_1)} \ldots U_{\pi/2,0}^{(i_2)} \ldots U_{\pi/2,0} |11 \ldots 1\rangle$$

and thus, $$I_{w_0} = I - 2|w_0\rangle\langle w_0| \qquad (IV.8)$$

$$= I - 2 \cdot (i^k) \cdot$$

$$U_{\pi/2,0}^{(i_1)} U_{\pi/2,0}^{(i_2)} \ldots U_{\pi/2,0}^{(i_k)} |11 \ldots 1\rangle\langle11 \ldots 1| U_{\pi/2,\pi}^{(i_k)} U_{\pi/2,\pi}^{(i_{k-1})} \ldots U_{\pi/2,\pi}^{(i_1)} (-i)^k$$

$$= I - 2U_{\pi/2,0}^{(i_1)} U_{\pi/2,0}^{(i_2)} \ldots U_{\pi/2,0}^{(i_k)} |11 \ldots 1\rangle\langle11 \ldots 1| U_{\pi/2,\pi}^{(i_k)} U_{\pi/2,\pi}^{(i_2)} \ldots U_{\pi/2,\pi}^{(i_k)}$$

$$= U_{\pi/2,0}^{(i_1)} U_{\pi/2,0}^{(i_2)} \ldots U_{\pi/2,0}^{(i_k)} (I - 2|11 \ldots 1\rangle\langle11 \ldots 1|) U_{\pi/2,\pi}^{(i_k)} U_{\pi/2,\pi}^{(i_2)} \ldots U_{\pi/2,\pi}^{(i_k)},$$

which is exactly (IV.4). The equivalence of (IV.4) and (IV.8) demonstrates that O block 108 performs the same operation as $I_{w_0}$ in G.

Search block 110 performs "inversion about the average" in order to detect the state inverted by 0 block 108. Inversion about the average refers to the operation $I_s$ in G, defined as:

$$I_s = I - 2|s\rangle\langle s|; \text{ cf.(I.8)}. \qquad (IV.9)$$

The operation of search block 110 may be demonstrated by showing that:

$$U_{\pi,0}^{(1)} U_{\frac{\pi}{4},\frac{\pi}{2}}^{(1)} U_{\frac{\pi}{4},\frac{\pi}{2}}^{(2)} \ldots U_{-\frac{\pi}{4},\frac{\pi}{2}}^{(n)} K_n U_{\frac{\pi}{4},\frac{\pi}{2}}^{(1)} U_{\frac{\pi}{4},\frac{\pi}{2}}^{(2)} \ldots U_{\frac{\pi}{4},\frac{\pi}{2}}^{(n)} = -I_s. \qquad (IV.10)$$

In order to prove it, note that $$U_{\frac{\pi}{4},\frac{\pi}{2}}|1\rangle = \begin{bmatrix} \frac{\sqrt{2}}{2} & \frac{\sqrt{2}}{2} \\ -\frac{\sqrt{2}}{2} & \frac{\sqrt{2}}{2} \end{bmatrix} \begin{bmatrix} 0 \\ 1 \end{bmatrix} = \frac{1}{\sqrt{2}}[|0\rangle + |1\rangle].$$

Thus, similarly to (IV.3) and (IV.2), there is $$(U_{\pi/4,-\pi/2}^{(1)} |1\rangle) \otimes (U_{\pi/4,-\pi/2}^{(2)} |1\rangle) \otimes \ldots \otimes (U_{\pi/4,-\pi/2}^{(n)} |1\rangle) = \qquad (IV.11)$$

$$U_{\pi/4,-\pi/2}^{(1)} U_{\pi/4,-\pi/2}^{(2)} \ldots U_{\pi/4,-\pi/2}^{(n)} |11 \ldots\rangle =$$

$$\frac{1}{2^{n-2}}[|00 \ldots 00\rangle + \ldots + |11 \ldots 11\rangle] = |s\rangle.$$

Hence, from (IV.11) and the fact that $U^*_{\pi/4,-\pi/2} = U_{\pi/4\pi/2}$, we have $$I_s = I - 2|s\rangle\langle s|$$

$$= I - 2U_{\pi/4,-\pi/2}^{(1)} U_{\pi/4,-\pi/2}^{(2)} \ldots U_{\pi/4,-\pi/2}^{(n)} |11 \ldots 1\rangle\langle11 \ldots 1| U_{\pi/4,\pi/2}^{(n)} \ldots U_{\pi/4,\pi/2}^{(1)}$$

$$= U_{\pi/4,-\pi/2}^{(1)} U_{\pi/4,-\pi/2}^{(2)} \ldots U_{\pi/4,-\pi/2}^{(n)} [I - 2|11 \ldots 1\rangle\langle11 \ldots 1|] J U_{\pi/4,\pi/2}^{(1)} \ldots U_{\pi/4,\pi/2}^{(n)}$$

The rightmost gate 112 in search block 10, $U_{\pi,0}^{(I)}$, just represents $-I$. Hence (IV.10) follows.

It should be noted that, in order to perform one iteration $G|s\rangle$, we need as many as $$2 \cdot (22n-75) + 5n + 1 = 49n - 149$$

elementary quantum gates. To perform $G^k|s\rangle$, we need no more than $$2k \cdot (22n - 75) + n + (4n + l)k = (48k + l)n - 149k$$

elementary quantum optical operations. With regard to the actual creation of the quantum gates, numerous possible options are available for producing one-bit unitary and two-bit quantum phase gates, and the particular implementation may vary depending on the needs of the system and the practicality of construction. For example, one possibility for producing large numbers of gates might involve resonant coupling of atoms with classical fields and dispersive coupling of atoms with quantized cavity fields, which has been demonstrated to produce both one- and two-bit gates. In addition, the described techniques need not be limited to one- and two-bit quantum gates. For instance, the techniques may incorporate n-bit quantum gates as new gates are discovered.

Although the particular invention has been described with several embodiments, a myriad of changes, variations, alterations, transformations, and modifications may be suggested to one skilled in the art. It is intended, therefore, that the present invention encompass any such changes, variations, alterations, transformations, and modifications as fall within the scope of the appended claims.

What is claimed is:

1. A method for performing a data search, comprising:
    initializing a plurality of qubits by generating a superposition of quantum states in each of the qubits, the qubits initialized using a plurality of first one-bit unitary gates, a one-bit unitary gate operable to perform a unitary gate operation;
    inverting the sign of a target quantum state maintained on the qubits, the sign inverted using a plurality of second one-bit unitary gates and a plurality of second two-bit quantum phase gates, a two-bit quantum phase gate comprising a cavity quantum electrodynamic device;
    calculating an inversion about the average on the qubits using a plurality of third one-bit unitary gates and a plurality of third two-bit quantum phase gates; and
    iterating the inverting and calculating steps to determine a search result corresponding to the target quantum state.

2. The method of claim 1, wherein the inverting step comprises:
    converting the target quantum state to a selected quantum state;
    inverting the sign of the selected quantum state; and
    converting the selected quantum state back to the target quantum state while preserving the new sign.

3. The method of claim 2, wherein the selected quantum state comprises a vector in a Hilbert space of the form $|11 \ldots 11\rangle$.

4. The method of claim 2, wherein the calculating step comprises:
    applying the plurality of third one-bit unitary gates and the plurality of third two-bit quantum phase gates to the qubits to perform an inversion about the average on the qubits; and
    applying the negative of the identity matrix to a most significant qubit after the inversion about the average is performed.

5. The method of claim 1, wherein the method is performed in a quantum system selected from the group consisting of: a nuclear magnetic resonance system, an optical system, and a cavity quantum electrodynamic system.

6. The method of claim 1, wherein the number of qubits is greater than two.

7. A device for performing a data search, comprising:
    an initialization block comprising a plurality of first circuits, the plurality of first circuits comprising a plurality of first one-bit unitary gates, a one-bit unitary gate operable to perform a unitary gate operation the initialization block operable to generate a superposition of quantum states in a plurality of qubits;
    a write block comprising a plurality of second circuits, the plurality of second circuits comprising a plurality of second one-bit unitary gates and a plurality of second two-bit quantum phase gates, a two-bit quantum phase gate comprising a cavity quantum electrodynamic device, the write block operable to invert the sign of a target quantum state maintained on the qubits; and
    a search block comprising a plurality of third circuits, the plurality of third circuits comprising a plurality of third one-bit unitary gates and a plurality of third two-bit quantum phase gates, the search block operable to calculate an inversion about the average to determine a search result, the search result the search result corresponding to the target quantum state.

8. The device of claim 7, wherein:
    the initialization block comprises a Walsh-Hadamard block; and
    the write block comprises:
        a first subset of the plurality of second unitary gates, the first subset operable to convert the target quantum state to a selected quantum state;
        a key transformation comprising a second subset of the plurality of second unitary gates and the plurality of second quantum phase gates, the key transformation operable to invert the sign of the selected quantum state; and
        a third subset of the plurality of second unitary gates, the third subset operable to convert the selected quantum state back to the target quantum state while preserving the new sign.

9. The device of claim 8, wherein the selected quantum state comprises a vector in a Hilbert space of the form $|11 \ldots 11\rangle$.

10. The device of claim 7, wherein the search block comprises:
    a subset of the plurality of third one-bit unitary gates and the plurality of third two-bit quantum phase gates, the subset operable to perform an inversion about the average on the qubits; and
    a one-bit unitary gate of the plurality of third one-bit unitary gates, the one-bit gate operable to apply the negative of the identity matrix to a most significant qubit.

11. The device of claim 7, wherein the device comprises a quantum system selected from the group consisting of: a nuclear magnetic resonance system, an optical system, and a cavity quantum electrodynamic system.

12. The device of claim 7, wherein the number of qubits is greater than two.

13. A method for implementing a data search of an arbitrary number n of qubits, comprising:
    providing n qubits and (n−3) scratch bits;
    initializing the qubits by generating a superposition of quantum states in each qubit;
    providing a $K_n$ key transformation comprising (2n−7) third-order key transformations, each third-order key transformation controlled by two qubits to invert the sign of a third qubit, the third-order key transformations comprising:
        two first third-order key transformations controlled by two input qubits;
        a last third-order key transformation controlled by a least significant scratch bit and inverting a least significant qubit; and
        intermediate third-order key transformations, each controlled by a first scratch bit and one input qubit and inverting a second scratch bit;
    applying a first plurality of one-bit unitary gates to a target quantum state on the qubits to convert the target quantum state to a selected quantum state;
    controlling the $K_n$ key transformation to invert the sign of the selected quantum state;
    applying a second plurality of one-bit unitary gates to convert the selected quantum state back to the target quantum state while preserving the new sign;

calculating an inversion about the average using a search block comprising:
the $K_n$ key transformation; and
a plurality of third one-bit unitary gates; and
determining a search result corresponding to the target quantum state based on the calculation.

14. The method of claim 13, wherein the method is performed in a quantum system selected from the group consisting of: a nuclear magnetic resonance system, an optical system, and a cavity quantum electrodynamic system.

15. The method of claim 13, wherein n is greater than two.

16. The method of claim 13, wherein the selected quantum state space of the form $|11\ldots11\rangle$.

17. A method for implementing a quantum gate circuit for data search of a number n of qubits, comprising:
providing a number n of qubits and a number (n−3) of scratch bits;
initializing the qubits by generating a superposition of quantum states in each qubit using an initializing one-bit unitary gate;
performing the following on the initialized qubits for a number $$\left\lfloor \frac{\pi}{4}\sqrt{n} \right\rfloor$$

of iterations, the number $$\left\lfloor \frac{\pi}{4}\sqrt{n} \right\rfloor$$

representing the largest integer less than or equal to $$\frac{\pi}{4}\sqrt{n}:$$

applying a plurality of first one-bit unitary gates to a target quantum state on the qubits to convert the target quantum state to a selected quantum state, the selected quantum state having a sign;
controlling a key transformation $K_n$ to invert the sign of the selected quantum state to yield a next sign;
applying a plurality of second one-bit unitary gates to convert the selected quantum state back to the target quantum state while preserving the next sign; and
calculating an inversion about the average transformation using a circuit block comprising the key transformation $K_n$ and a plurality of third one-bit unitary gates; and
performing a quantum measurement based on the calculated inversion to determine a search result corresponding to the target quantum state.

18. The method of claim 17, wherein the key transformation $K_n$ comprises:
a number (2n−7) of third-order key transformations $K_3$, each third-order key transformation $K_3$ operable to invert a sign of a third qubit, each third-order key transformation $K_3$ comprising:
a plurality of first-order key transforms operable to receive a plurality of input qubits;
a final third-order key transformation operable to invert a least significant qubit in response to a least significant scratch bit; and
a plurality of intermediate third-order key transformations, each intermediate third-order key transformation operable to invert a second scratch bit in response to a first scratch bit and one input qubit.

19. The method of claim 17, wherein the method is performed by a quantum system a group consisting of: a nuclear magnetic resonance system, an optical system, and a cavity quantum electrodynamic system.

20. The method of claim 17, wherein the number n is greater than two.

21. The method of claim 17, wherein the selected quantum state comprises a vector in a Hilbert space, the vector having a form $|11\ldots\rangle$.

22. The method of claim 17, wherein the selected quantum state comprises a standard basis vector of a $2^n$-dimensional Hilbert space, the standard basis vector having a form $|a_1 a_2 \ldots a_n\rangle$, where each of $a_1, a_2, \ldots, a_n$, represents either 0 or 1.

* * * * *